(12) United States Patent
Lin et al.

(10) Patent No.: US 11,048,298 B2
(45) Date of Patent: Jun. 29, 2021

(54) HEAD-MOUNTED DISPLAY DEVICE

(71) Applicant: HTC Corporation, Taoyuan (TW)

(72) Inventors: Sheng-Cherng Lin, Taoyuan (TW); Jui-Hsiang Lin, Taoyuan (TW); Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/361,223

(22) Filed: Mar. 22, 2019

(65) Prior Publication Data

US 2020/0050236 A1 Feb. 13, 2020

Related U.S. Application Data

(60) Provisional application No. 62/717,914, filed on Aug. 13, 2018, provisional application No. 62/736,413, filed on Sep. 25, 2018.

(51) Int. Cl.
*G02B 27/01* (2006.01)
*G06F 1/16* (2006.01)

(52) U.S. Cl.
CPC .................... *G06F 1/163* (2013.01)

(58) Field of Classification Search
None
See application file for complete search history.

(56) References Cited

U.S. PATENT DOCUMENTS

| 3,362,403 | A | 1/1968 | Fleming et al. | |
|---|---|---|---|---|
| 8,237,626 | B2* | 8/2012 | Ishino | G02B 27/0176 345/8 |
| 2011/0225709 | A1* | 9/2011 | Saylor | A61F 9/026 2/431 |
| 2017/0261753 | A1* | 9/2017 | Fujishiro | G06F 1/163 |
| 2018/0103917 | A1* | 4/2018 | Kim | A61B 5/24 |
| 2019/0179409 | A1* | 6/2019 | Jones | G02B 27/0093 |

FOREIGN PATENT DOCUMENTS

| CN | 102892391 | 1/2013 |
|---|---|---|
| CN | 204556956 | 8/2015 |
| CN | 205003374 | 1/2016 |
| CN | 105404004 | 3/2016 |
| CN | 105739100 | 7/2016 |
| CN | 107422482 | 12/2017 |
| CN | 108345109 | 7/2018 |
| CN | 108388011 | 8/2018 |
| TW | I631371 | 8/2018 |

OTHER PUBLICATIONS

"Office Action of Taiwan Counterpart Application," dated Jan. 22, 2020, p. 1-p. 7.
"Office Action of China Counterpart Application", dated Apr. 2, 2021, pp. 1-11.

* cited by examiner

*Primary Examiner* — Carl Adams
(74) *Attorney, Agent, or Firm* — JCIPRNET

(57) ABSTRACT

A head-mounted display device includes a display portion and a face-fitting frame. The face-fitting frame has flexibility and is partially connected to the display portion.

13 Claims, 11 Drawing Sheets

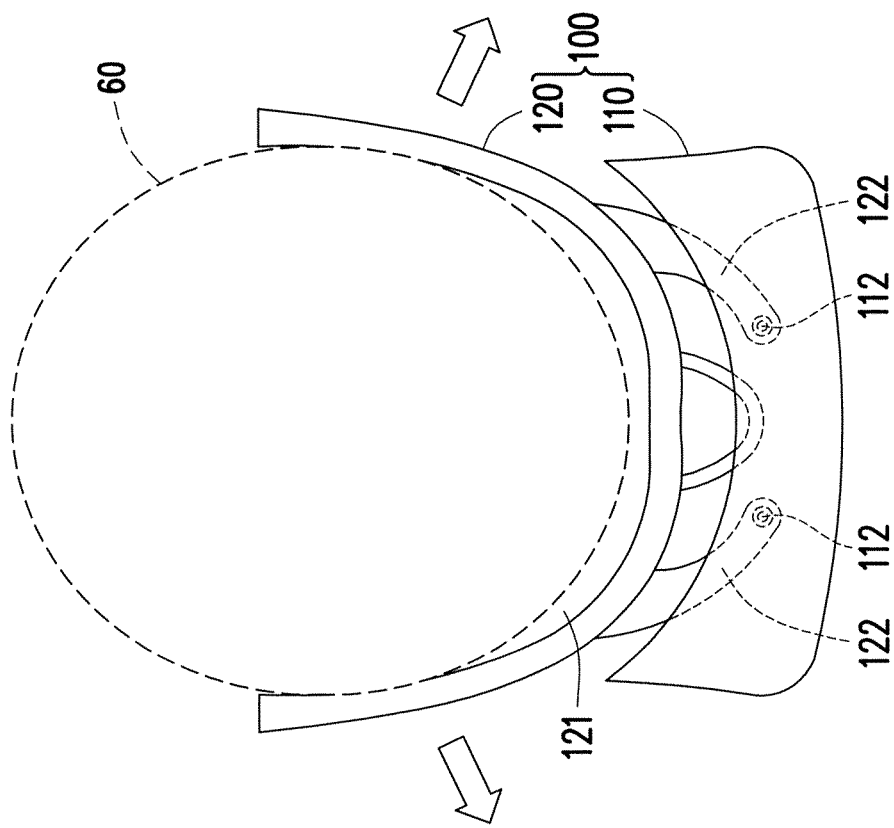
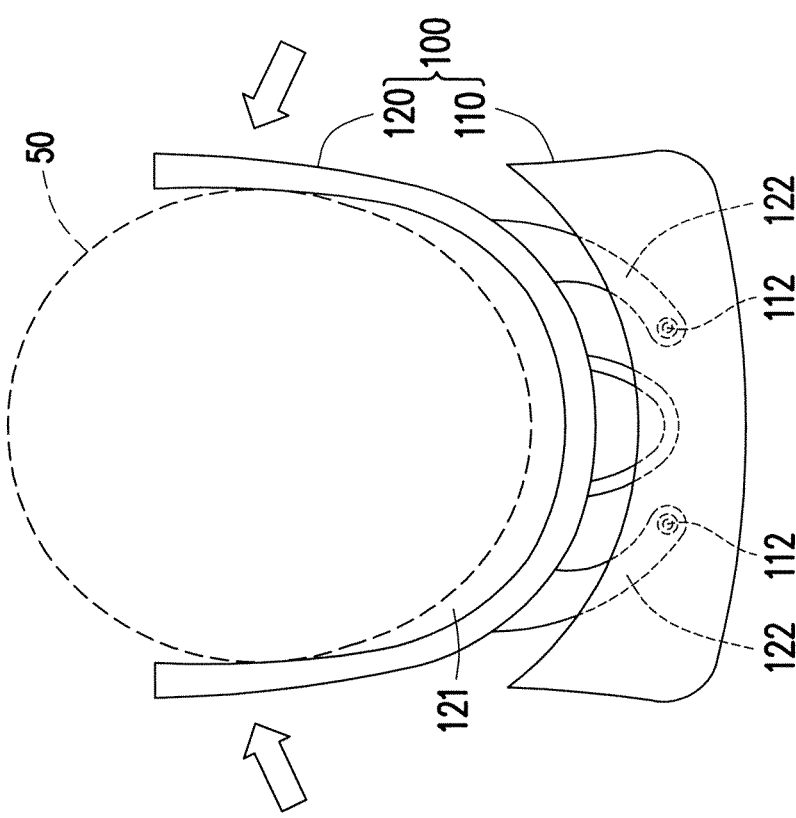

HEAD-MOUNTED DISPLAY DEVICE

CROSS-REFERENCE TO RELATED APPLICATION

This application claims the priority benefit of U.S. provisional application Ser. No. 62/717,914, filed on Aug. 13, 2018, and U.S. provisional application Ser. No. 62/736,413, filed on Sep. 25, 2018. The entirety of each of the above-mentioned patent applications is hereby incorporated by reference herein and made a part of this specification.

BACKGROUND

Technical Field

The disclosure relates to a display device, and specifically relates to a head-mounted display device.

Description of Related Art

In recent years, the application of Virtual Reality (VR) has become more and more popular, and there are quite a lot of types of head-mounted display devices. However, in the conventional head-mounted display devices, the component used for contacting the face is not suitable for all users, and some users may feel uncomfortable while wearing those head-mounted display devices. Therefore, how to make the head-mounted display device to be firmly worn on the head of the user and to further provide for the user a comfortable feeling while wearing are extremely important topics in the field.

SUMMARY

The disclosure provides a head-mounted display device assisting in enhancing the comfort for the user when wearing.

A head-mounted display device of the disclosure includes a display portion and a face-fitting frame. The face-fitting frame has flexibility and is partially connected to the display portion.

Based on the above, the head-mounted display device of the disclosure has the face-fitting frame that has flexibility and that is partially connected to the display portion. When the user wears the head-mounted display device of the disclosure, the face-fitting frame can be elastically deformed to fit to different faces of different users, so as to assist in enhancing the comfort of the user wearing the head-mounted display device and also to increase the stability of the head-mounted display device on the head of the user.

In order to make the aforementioned and other features and advantages of the disclosure more comprehensible, embodiments accompanying figures are described in detail belows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1D and FIG. 1E are schematic views of different users wearing the head mounted display device in FIG. 1A.

DESCRIPTION OF THE EMBODIMENTS

Figure 1A:
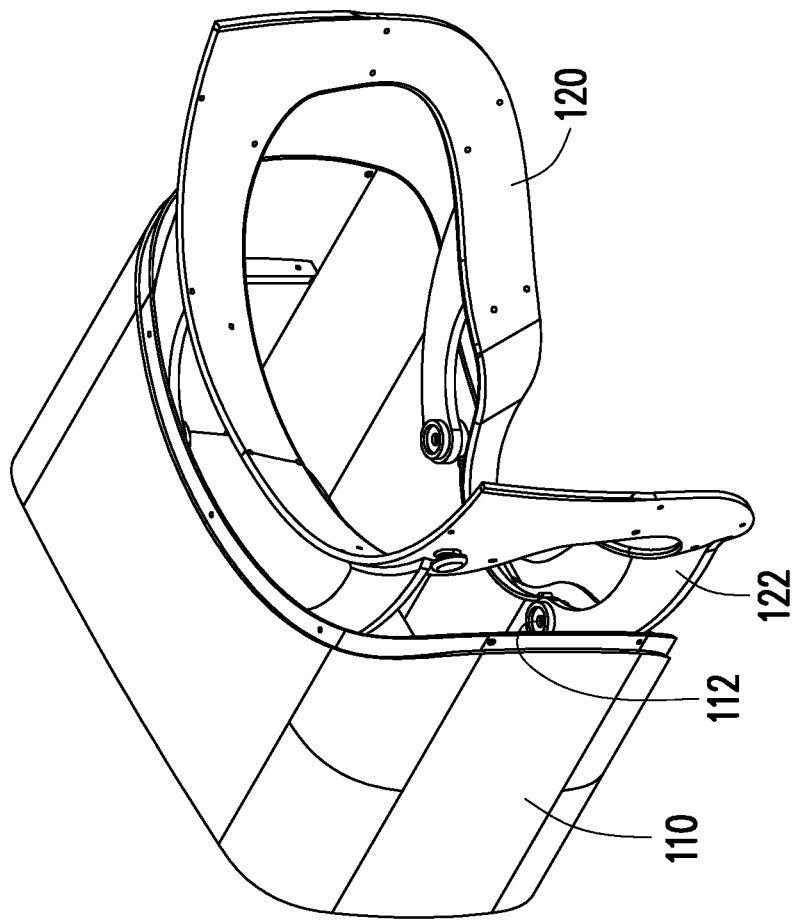
FIG. 1A is a three-dimensional schematic view depicting a head mounted display device in one embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
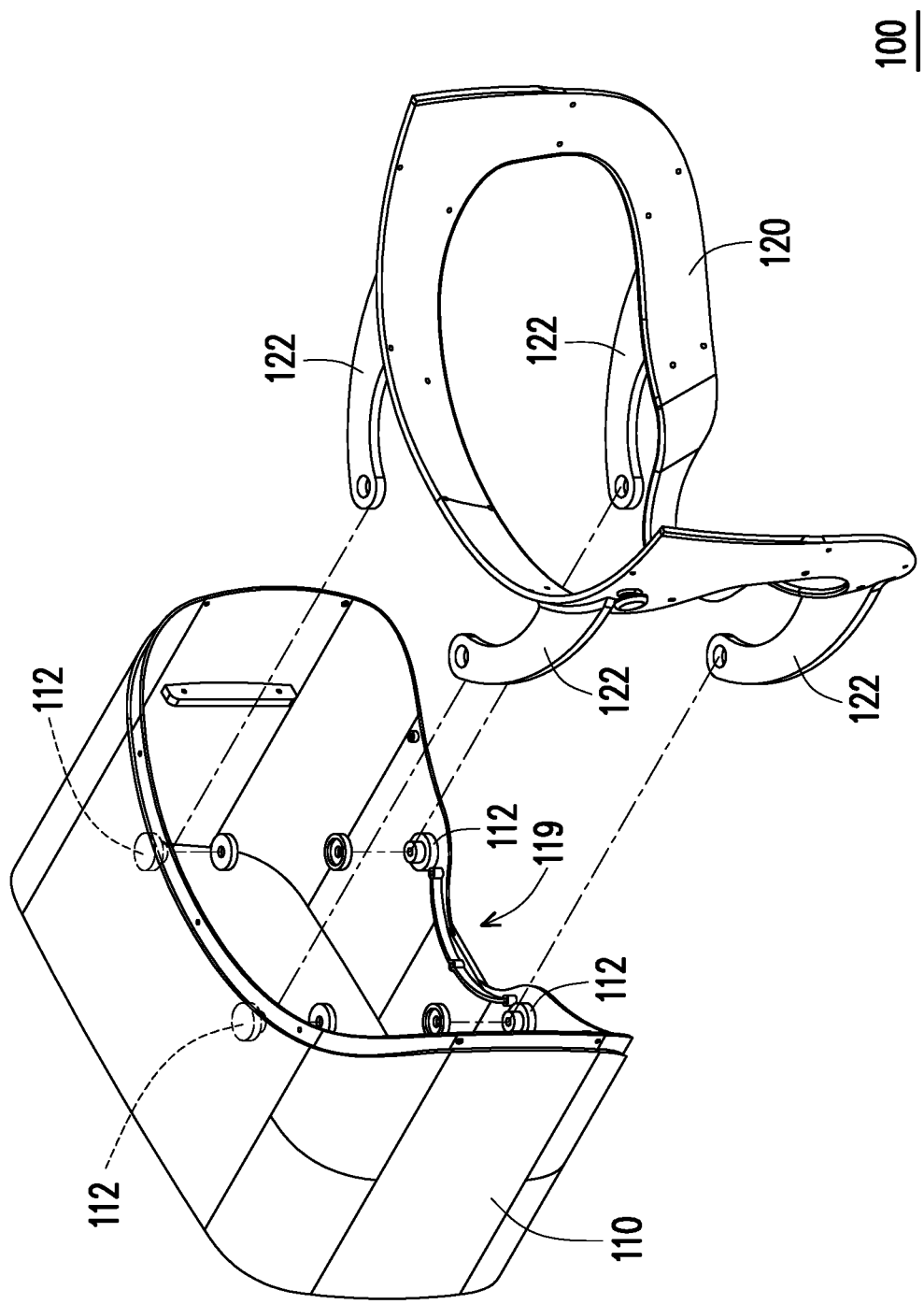
FIG. 1B is an exploded view depicting the head mounted display device in FIG. 1A.
Figure 1C:
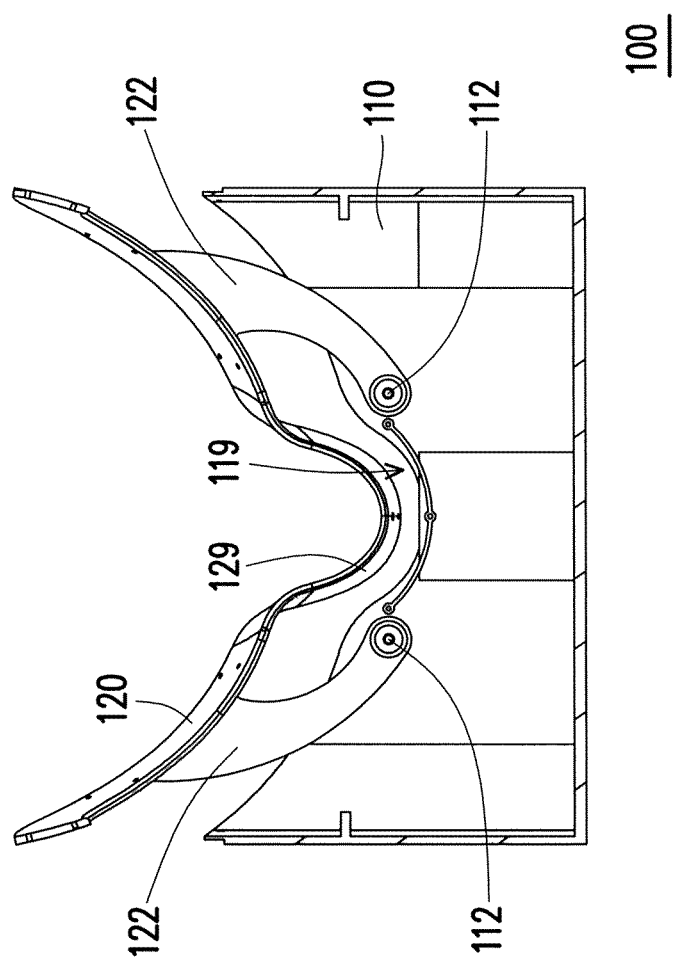
FIG. 1C is a cross-sectional view depicting the head mounted display device in FIG. 1A.

FIG. 1A is a three-dimensional schematic view depicting a head mounted display device in one embodiment of the invention. FIG. 1B is an exploded view depicting the head mounted display device in FIG. 1A. FIG. 1C is a cross-sectional view depicting the head mounted display device in FIG. 1A. Referring to FIG. 1A, FIG. 1B, and FIG. 1C, a head-mounted display device 100 includes a display portion 110 and a face-fitting frame 120. The face-fitting frame 120 has flexibility and is partially connected to the display portion 110. The face-fitting frame 120 is adapted to be in contact with the face of the user. Since the face-fitting frame 120 and the display portion 110 are partially connected only, the portion, which is not connected to the display portion 110, of the face-fitting frame 120 can be elastically deformed according to the shape of the user's face.

In comparison, the portion contacting the face of the user in the conventional head-mounted display device has a shape that is basically fixed and cannot be deformed. Therefore, a phenomenon that the head-mounted display device is in contact with the face of the user at only a few areas occurs, and thus the face of the user is subject to an excessive pressure at the contact area and the excessive pressure causes discomfort. However, when the user wears the head-mounted display device 100 of the disclosure, the face-fitting frame 120 can be elastically deformed to fit to different faces of different users, so as to assist in enhancing the comfort of the user wearing the head-mounted display device 100 and also to increase the stability of the head-mounted display device 100 on the head of the user.

In the present embodiment, the display portion 110 has two pairs of shaft portions 112, and the two pairs of shaft portions 112 are located on the top surface and the bottom surface inside the display portion 110. The face-fitting frame 120 has two pairs of cantilevers 122, and the two pairs of cantilevers 122 are located at the top side and the bottom side of the display portion 110, respectively. The end portions of the two pairs of cantilevers 122 are pivotally connected to the two pairs of shaft portions 112, respectively, so as to support the display portion 110. For example, each of the cantilevers 122 has a curved shape, the cantilevers 122 of each pair are curved toward each other. It should be noted here, in other embodiments, there is only one pair of the shaft portions 112 and only one pair of cantilevers 122. For example, the one pair of cantilevers 122 may be disposed at the top side of the face-fitting frame 120 and is pivotally connected to the shaft portions 122 located at the top side of the display portion 110, the disclosure is not limited thereto.

In the present embodiment, the display portion 110 has a notch 119. The face-fitting frame 120 has a nose-fitting portion 129 protruding toward the notch 119. The nose-fitting portion 129 is adapted to contact with the nose of the user to assist in enhancing the comfort of the user while wearing.

FIG. 1D and FIG. 1E are schematic views of different users wearing the head mounted display device in FIG. 1A. It is noted that, in order to make the drawings easier to understand, FIG. 1D and FIG. 1E only schematically illustrate the state in which the user wears the head-mounted display device 100. Referring to FIG. 1D, when the user 50 with a small head size wears the head-mounted display device 100 of the disclosure, the cantilever 122 can rotate with the shaft portion 112 as a fulcrum. As shown by the arrows in FIG. 1D, the curvature of the face-fitting frame 120 is reduced so the face-fitting frame 120 fits to two sides of the head of the user 50, and thus the head-mounted display device 100 is firmly worn on the head of the user 50. Next, referring to FIG. 1E, when the user 50 with a big head size wears the head-mounted display device 100 of the disclosure, the cantilever 122 can rotate with the shaft portion 112 as a fulcrum. At this time, the face-fitting frame 120 is pressed by the head of the user 60 so as to be deformed and expanded toward two sides and to increase the curvature, as shown by the arrows in FIG. 1E. In this way, it is ensured that there are more contact areas between the face-fitting frame 120 and the head of the user 60, so as to prevent the phenomenon that the contact area is too small so the force is concentrated, which causes the head of the user to be subject to an excessive pressure at the contact area. Therefore, the user may have a better experience. To be more specific, the face-fitting frame 120 may be configured to have a soft pad 121 which is used to contact the head of the user while the head-mounted display device 100 is worn on the head of the user, so as to assist the user to wear the head-mounted display device 100 more stably on the head and to enhance the comfort of the user wearing the head-mounted display device 100 as well.

Figure 2A:
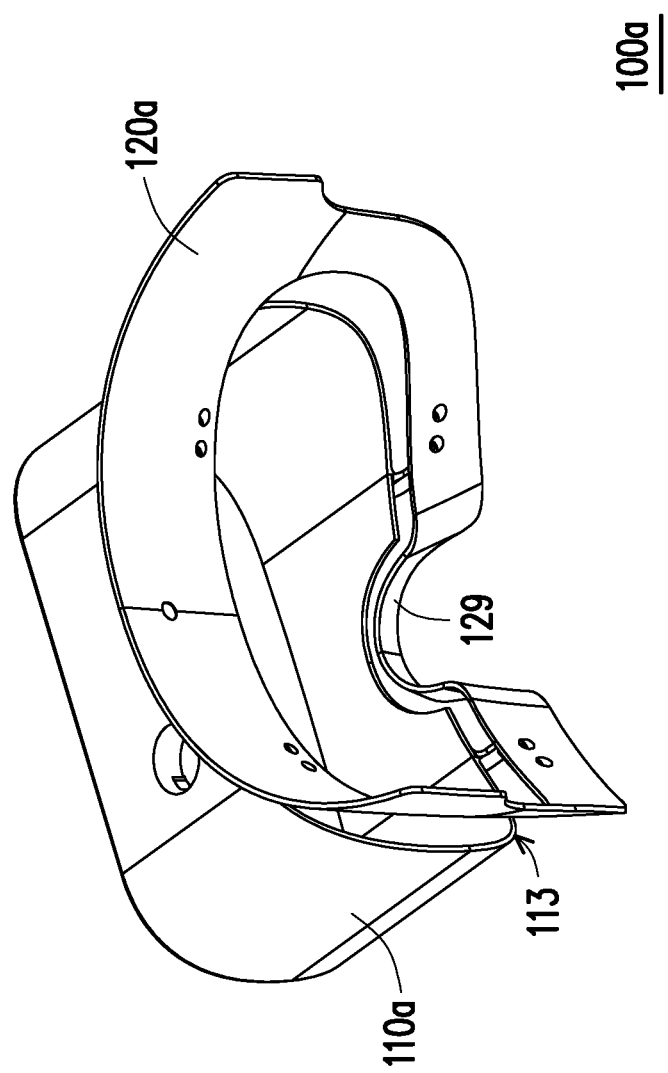
FIG. 2A is a three-dimensional schematic view depicting a head mounted display device in another embodiment of the invention.
Figure 2B:
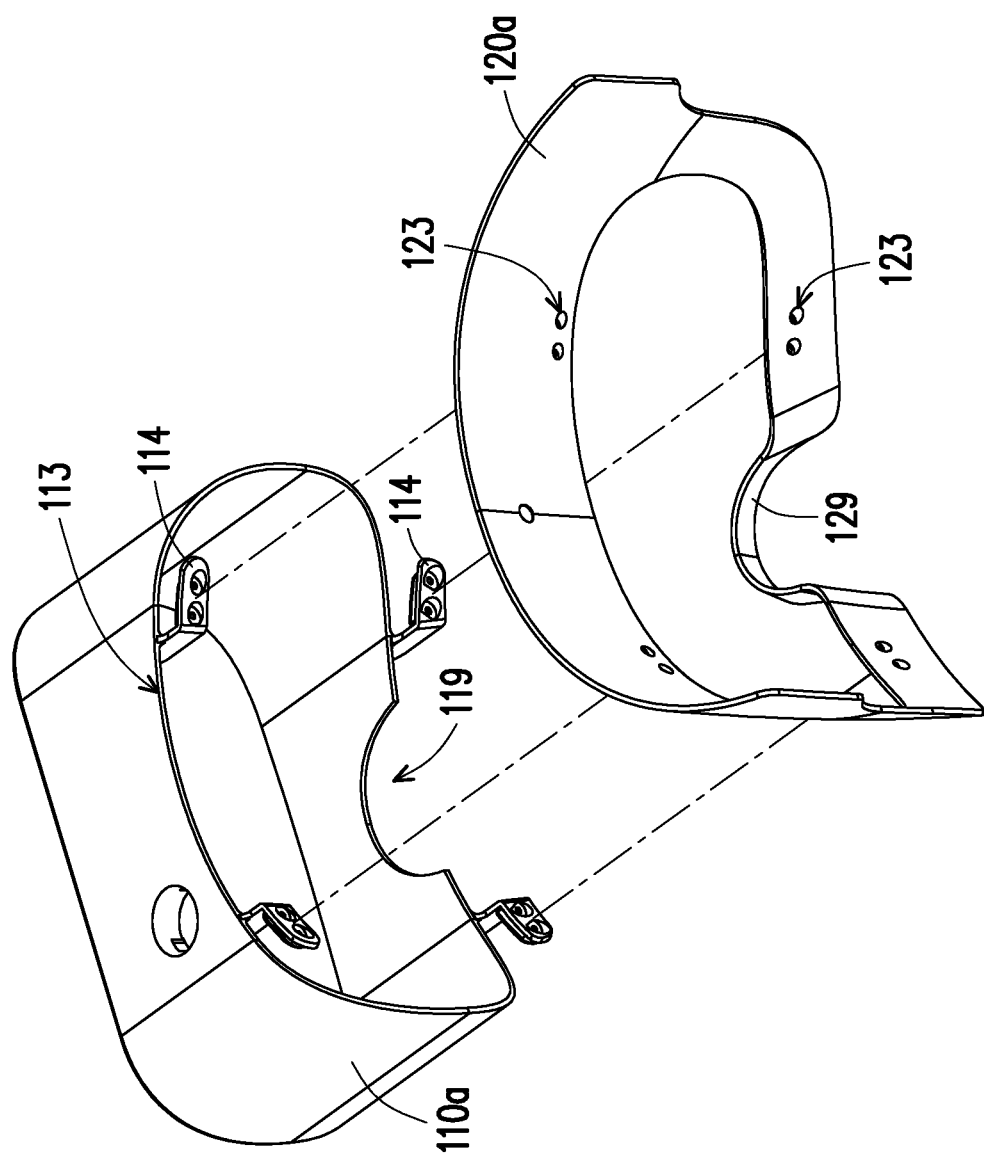
FIG. 2B is an exploded view depicting the head mounted display device in FIG. 2A.

FIG. 2A is a three-dimensional schematic view depicting a head mounted display device in another embodiment of the invention. FIG. 2B is an exploded view depicting the head mounted display device in FIG. 2A. Referring to FIG. 2A and FIG. 2B, a head-mounted display device 100a of the present embodiment is similar to the head-mounted display 100 in FIG. 1A to FIG. 1C. The head-mounted display device 100a includes a display portion 110a and a face-fitting frame 120a. The face-fitting frame 120a has flexibility and is partially connected to the display portion 110a. The display portion 110a has two pairs of cantilevers 114, and the two pairs of cantilevers 114 are located at the top side and the bottom side of the display portion 110a, respectively. The face-fitting frame 120a has keyholes 123 corresponding to the two pairs of cantilevers 114, so the face-fitting frame 120a is locked to the cantilevers 114. It should be noted here, in other embodiments, there is only one pair of cantilevers 114 disposed at the top side of the display portion 110a, but the disclosure is not limited thereto. Furthermore, the cantilevers 114 are extended and bent from an end face 113 of the display portion 110a and are corresponding to the profile of the face-fitting frame 120a. In the present embodiment, the face-fitting frame 120a is fixed to the cantilevers 114 by means of screwing, but the method of fixing the cantilevers 114 and the face-fitting frame 120a in the disclosure is not limited thereto. Since the display portion 110a and the face-fitting frame 120a are partially connected via only two pairs of cantilevers 114 and the face-fitting frame 120a has flexibility, the head-mounted display 100a may fit to different faces of different users, so as to assist in enhancing the comfort of the user wearing the head-mounted display device 100a and also to increase the stability of the head-mounted display device 100a on the head of the user.

Figure 3A:
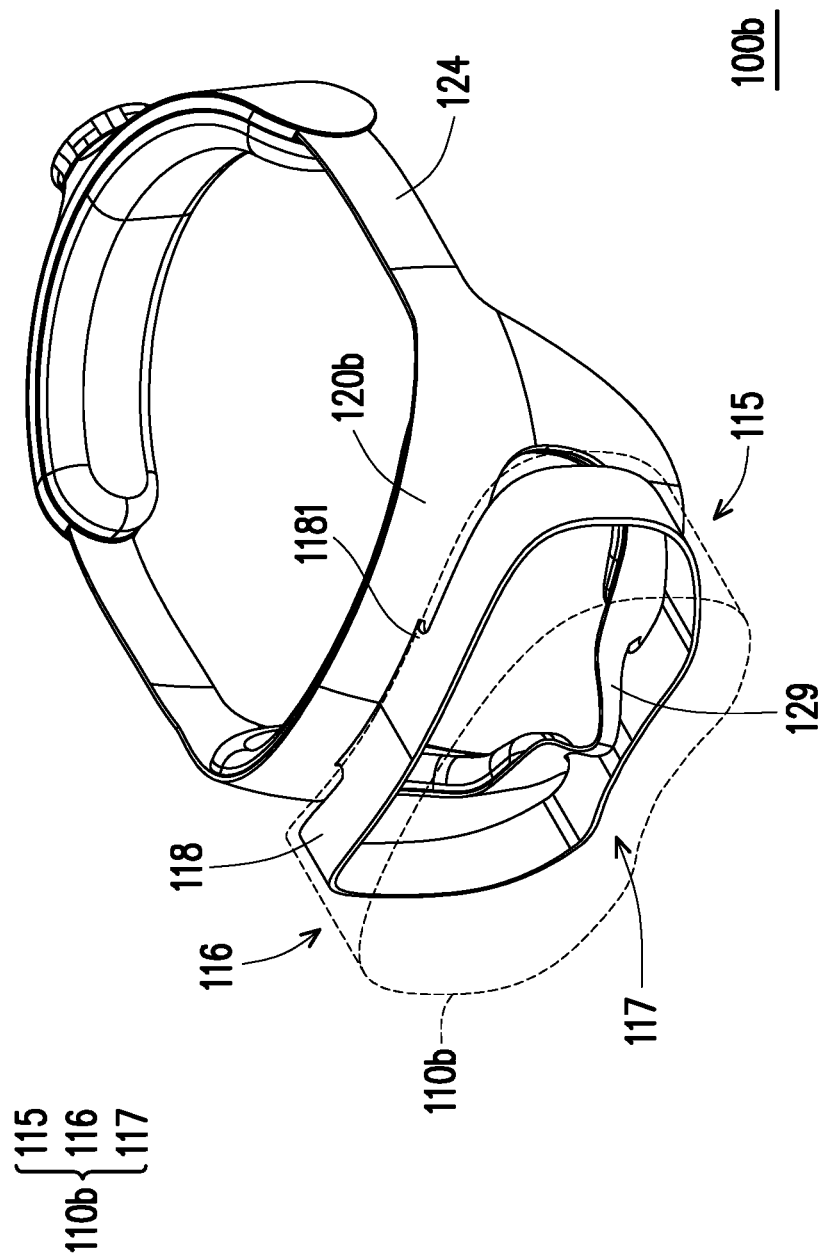
FIG. 3A is a three-dimensional schematic view depicting a head mounted display device in yet another embodiment of the invention.
Figure 3B:
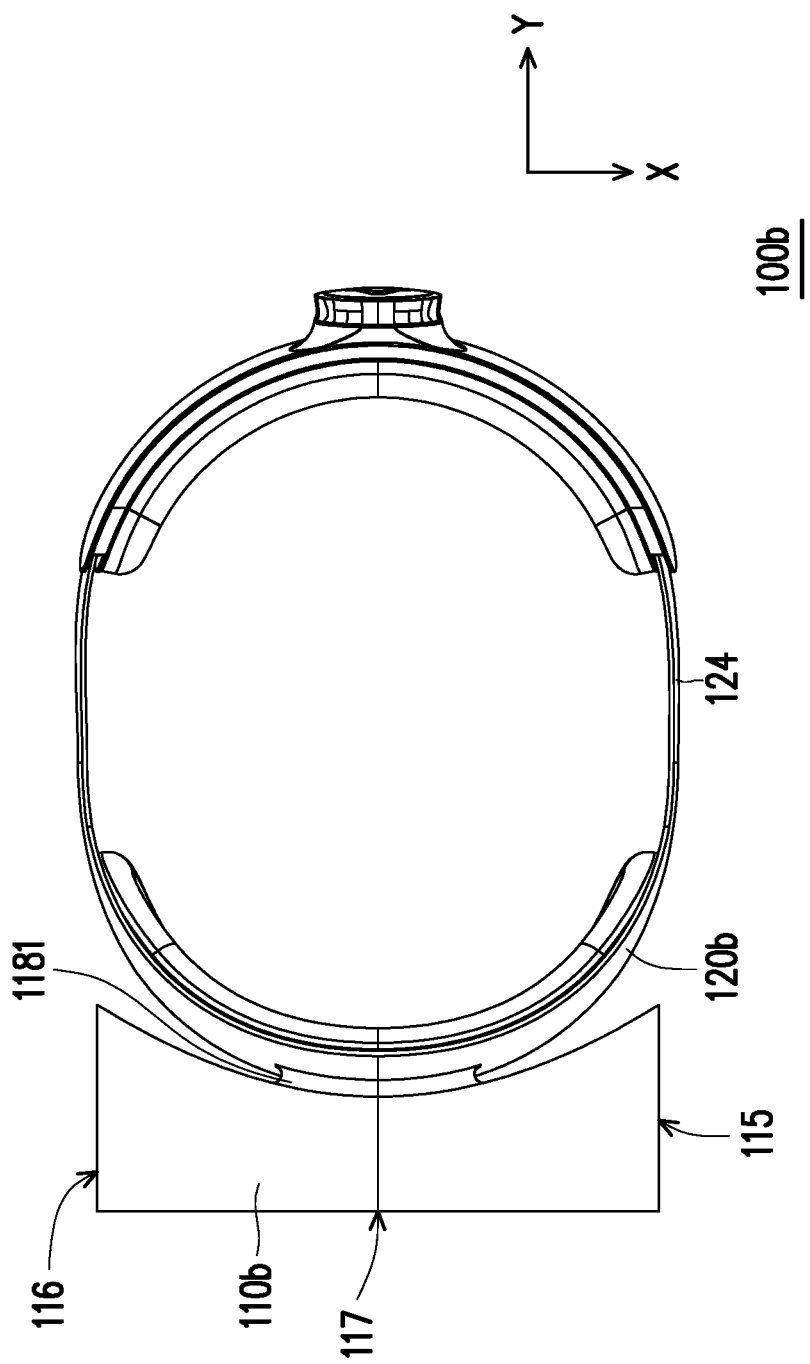
FIG. 3B is a schematic top view depicting the head mounted display device in FIG. 3A.

FIG. 3A is a three-dimensional schematic view depicting a head mounted display device in yet another embodiment of the invention. FIG. 3B is a schematic top view depicting the head mounted display device in FIG. 3A. Referring to FIG. 3A and FIG. 3B, a head-mounted display device 100b of the present embodiment is similar to the head-mounted display 100 in FIG. 1A to FIG. 1C. The head-mounted display device 100b includes a display portion 110b and a face-fitting frame 120b. The face-fitting frame 120b has flexibility and is partially connected to the display portion 110b.

Figure 3C:
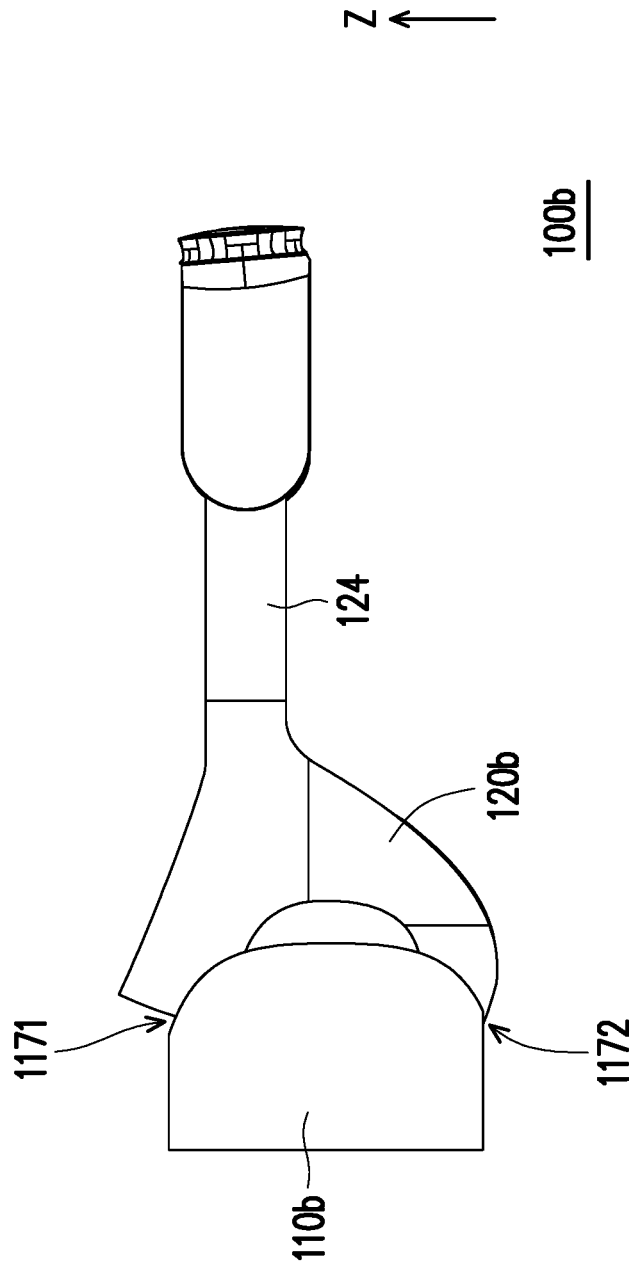
FIG. 3C is a schematic side view depicting the head mounted display device in FIG. 3A.

In the present embodiment, the display portion 110b is divided into a left area 115, a right area 116, and a central area 117. The central area 117 is located between the left area 115 and the right area 116. A portion, which is located in the central area 117, of the display portion 110b is connected to the face-fitting frame 120b. Namely, as shown in FIG. 3B, the face-fitting frame 120b is only connected to the portion at the central area 117 of the display portion 110b, and the face-fitting frame 120b is not connected to the portions located at the left area 115 and the right area 116 of the display portion 110b. Furthermore, as shown in FIG. 3C, the portions at the top side 1171 and the bottom side 1172 of the central area 117 of the display portion 110b are respectively connected to the face-fitting frame 120b.

In the head-mounted display device 100b of the present embodiment, since the face-fitting frame 120b is only fixed to the portions at the central area 117 of the display portion 110b, the portions, which are not connected to the display portion 110b, of the face-fitting frame 120b can be deformed according to the size of the head of the user. Therefore, the face-fitting frame 120b has flexibility on a plane XZ, so as to provide comfort while wearing to the different users.

In the present embodiment, the display portion 110b has a ring frame 118 disposed inside the display portion 110b. The portion, which is located in the central area 117, of the ring frame 118 is connected to the face-fitting frame 120b. The ring frame 118 and the face-fitting frame 120b are integrally formed, as an example. In the present embodiment, the ring frame 118 has an extending part 1181 extended toward the face-fitting frame 120b. As shown in FIG. 3B, the display portion 110b is connected to the portion, which presses against the forehead of the user, of the face-fitting frame 120b via the extending part 1181. The face-fitting frame 120b has a nose-fitting portion 129 protruding toward the display portion 110b. The nose-fitting portion 129 is connected to the ring frame 118.

In the present embodiment, the face-fitting frame 120b further has a band portion 124. The band portion 124 has a certain strength in the vertical direction Z and is used to firmly fix the face-fitting frame 120b to the head of the user.

After the user wears the head-mounted display device 100b of the present embodiment, the pressure applied to the head is evenly distributed on the face-fitting frame 120b, so as to enhance the wearing comfort of the user. Moreover, the display portion 110b can be stably held in front of the eyes of the user because of the structural configuration of the ring frame 118 and the nose-fitting portion 129.

Figure 4:
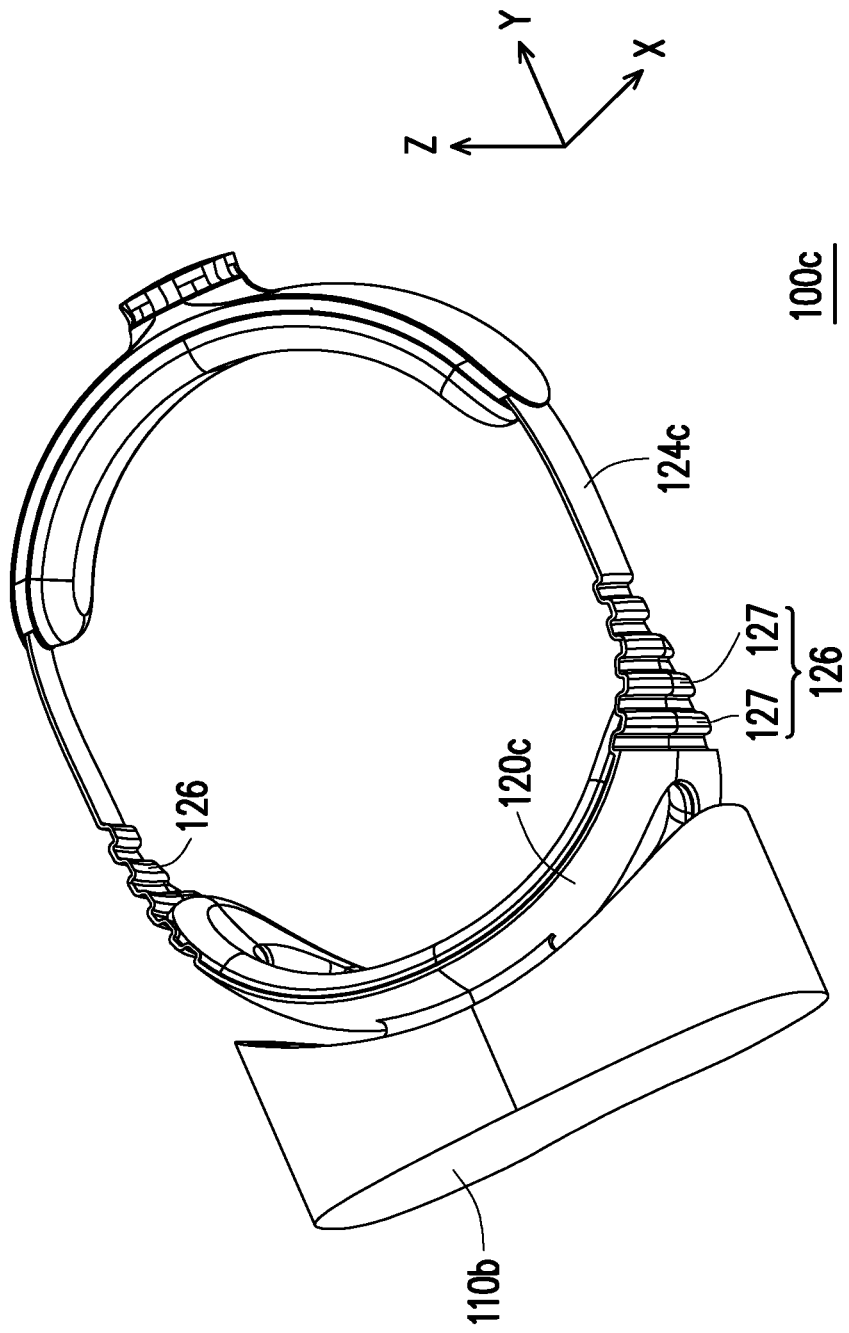
FIG. 4 is a three-dimensional schematic view depicting a head mounted display device in yet another embodiment of the invention.

FIG. 4 is a three-dimensional schematic view depicting a head mounted display device in yet another embodiment of the invention. Referring to FIG. 4, a head-mounted display device 100c of the present embodiment is similar to the head-mounted display 100b in FIG. 3A to FIG. 3C, the only difference is the band portion.

In the present embodiment, the portions, which are corresponding to left and right sides of the head of the user, of a band portion 124c have corrugated sections 126. The width of the corrugated section 126 decreases in a front to rear direction Y away from the display portion 110b.

As shown in FIG. 4, the corrugated section 126 has a plurality of ridges 127 sequentially arranged in the front and rear direction Y. The ridges 127 are extended in a vertical direction Z which is perpendicular to the front and rear direction Y. Because of the structural design of the corrugated section 126, the strength of the band portion 124c in the vertical direction Z is increased, so the band portion 124c is not easy to be bent in the vertical direction Z, in order to increase the stability of the face-fitting frame 120c fixed to the head of the user. On the other hand, the flexibility of the band portion 124c on the XY plane is increased.

Figure 5:
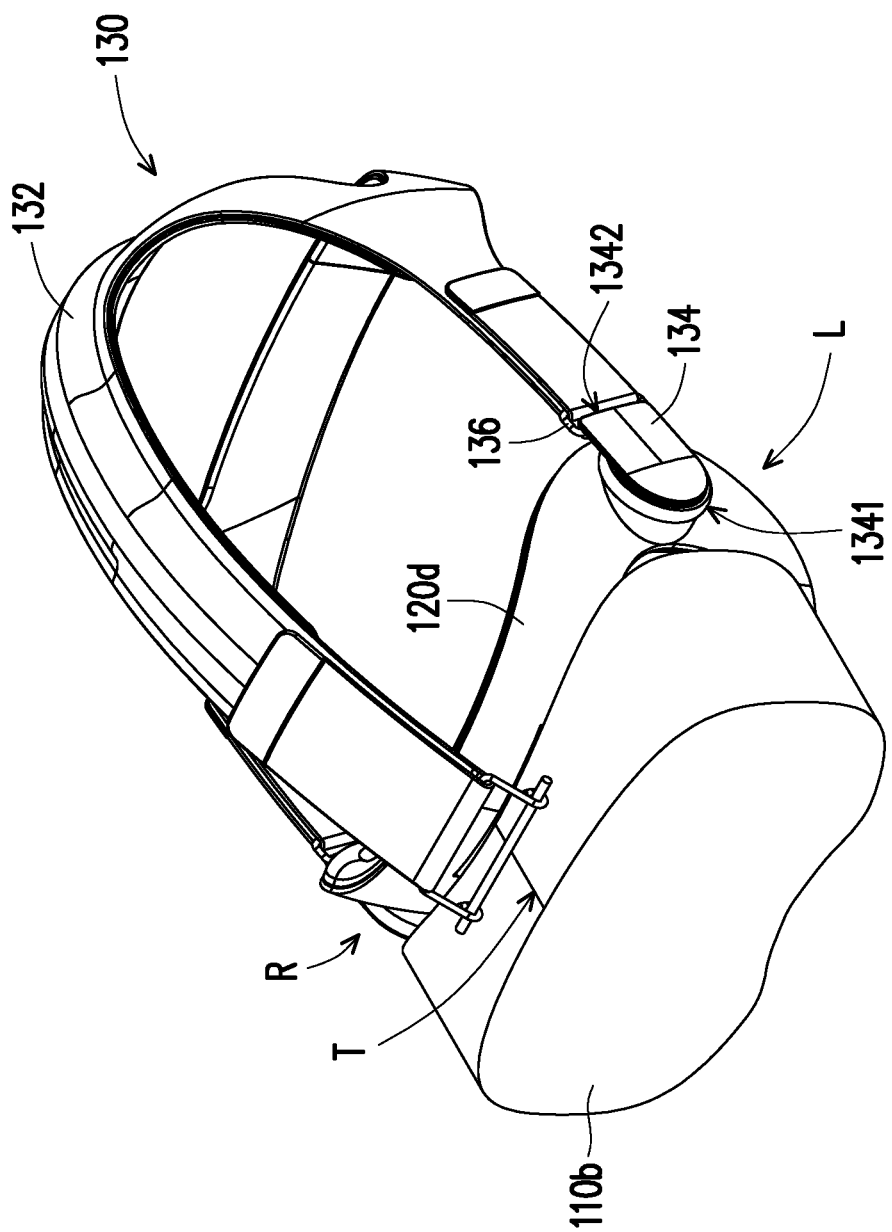
FIG. 5 is a three-dimensional schematic view depicting a head mounted display device in yet another embodiment of the invention.

FIG. 5 is a three-dimensional schematic view depicting a head mounted display device in yet another embodiment of the invention. Referring to FIG. 5, a head-mounted display device 100d of the present embodiment is similar to the head-mounted display 100b in FIG. 3A to FIG. 3C, but the head-mounted display device 100d of the present embodiment has a wearing band 130 to replace the band portion.

As shown in FIG. 5, three ends of the wearing band 130 are pivotally connected to a left side L and a right side R of the face-fitting frame 120d and a topside T of the display portion 110b, respectively. Since the wearing band 130 is connected to the face-fitting frame 120d, when the user wears the head-mounted display device 100d of the present embodiment, the face-fitting frame 120d may be driven by the wearing band 130 to better fit to the face of the user. It should be noted here, in other embodiments, the wearing band 130 may only be pivotally connected to the left side L and the right side R of the face-fitting frame 120d, but the disclosure is not limited thereto.

More specifically, the wearing band 130 includes a main band 132 and two opposite pivot segments 134 (only one pivot segment 134 is shown in FIG. 5). Each of the pivot segments 134 has the first end 1341 and the second end 1342 opposite to the first end 1341. The first end 1341 is pivotally connected to the left side L or the right side R of the face-fitting frame 120d (only the left side L is shown in FIG. 5). After each of the two ends of the main band 132 passes through a retaining ring 136 of the second end 1342, each of two ends of the main band 132 is removably attached to the other parts of the main band 132 except the two ends. It should be noted here, the above attaching method uses velcro or other adhesive material to achieve the fixing effect, but the disclosure is not limited thereto. The structural design of the wearing band 130 allows the two ends to be tightened or loosen freely depending on the size of the head of the user. Moreover, the face-fitting frame 120d of the present embodiment is partially connected to the display portion 110b also, so as to fit to different faces of different users and to assist in enhancing the comfort of the user wearing the head-mounted display device 100d and also to increase the stability of the head-mounted display device 100d on the head of the user.

Summarily, in the head-mounted display device of the disclosure, the face-fitting frame has flexibility and is partially connected to the display portion. Because of this design, the face-fitting frame fits different shapes of faces of different users, so as to increase the stability when the user wears the head-mounted display device of the disclosure and to enhance the wearing comfort as well.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head mounted display device, comprising:
a display portion; and
a face-fitting frame, having flexibility and partially connected to the display portion,
wherein the display portion is divided into a left area, a right area and a central area, the central area is located between the left area and the right area, the face-fitting frame is only connected to portions at the central area of the display portion, and the face-fitting frame is not connected to portions located at the left area and the right area of the display portion,
wherein the portions located on an upside and an underside of the central area of the display portion are respectively connected to the face-fitting frame, and the underside of the central area corresponds in position to a nose of a user.

2. The head mounted display device as recited in claim 1, wherein the display portion has at least one pair of shaft portions, the face-fitting frame has at least one pair of cantilevers, the pair of cantilevers is pivotally connected to the pair of shaft portions.

3. The head mounted display device as recited in claim 2, wherein each of the cantilevers has a curved shape, the cantilevers of the at least one pair of cantilevers are curved toward each other.

4. The head mounted display device as recited in claim 2, wherein a number of the at least one pair of shaft portions is two, a number of the at least one pair of cantilevers is two, the two pairs of cantilevers are located on a top side and a bottom side of the display portion, respectively.

5. The head mounted display device as recited in claim 1, wherein the display portion has at least one pair of cantilevers, and the face-fitting frame is fixed to the at least one pair of cantilevers.

6. The head mounted display device as recited in claim 5, wherein a number of the at least one pair of cantilevers is two, the two pairs of cantilevers are located on a top side and a bottom side of the display portion, respectively.

7. The head mounted display device as recited in claim 1, wherein the display portion has a ring frame, a portion at the central area of the ring frame is connected to the face-fitting frame.

8. The head mounted display device as recited in claim 7, wherein the ring frame and the face-fitting frame are integrally formed.

9. The head mounted display device as recited in claim 1, wherein the face-fitting frame has a band portion configured to fix the face-fitting frame to a head of the user, portions of the band portion corresponding to left and right sides of the head of the user have corrugated sections, a width of the corrugated section decreases in a direction away from the display portion.

10. The head mounted display device as recited in claim 1, further comprising a wearing band, wherein two ends of the wearing band are pivotally connected to a left side and a right side of the face-fitting frame, respectively.

11. The head mounted display device as recited in claim 10, wherein the wearing band comprises a main band and two pivot segments, an end of each of the pivot segments is pivotally connected to the left side or the right side of the face-fitting frame, each of two ends of the main band passes through a retaining ring of another end of each of the pivot segments so each of two ends of the main band is removably attached to other parts of the main band except the two ends.

12. The head mounted display device as recited in claim 1, further comprising a wearing band, wherein three ends of the wearing band are pivotally connected to a left side and a right side of the face-fitting frame and a top side of the display portion, respectively.

13. The head mounted display device as recited in claim 1, wherein the display portion has an opening, and the face-fitting frame has a nose-fitting portion protruding toward the opening.

\* \* \* \* \*